United States Patent
Garin et al.

(10) Patent No.: US 9,497,641 B2
(45) Date of Patent: Nov. 15, 2016

(54) CYCLIC SHIFT DELAY DETECTION USING A CLASSIFIER

(71) Applicant: QUALCOMM Incorporated, San Diego, CA (US)

(72) Inventors: Lionel Jacques Garin, Palo Alto, CA (US);
(Continued)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 13/759,844

(22) Filed: Feb. 5, 2013

(65) Prior Publication Data

US 2014/0153420 A1    Jun. 5, 2014

Related U.S. Application Data

(60) Provisional application No. 61/732,862, filed on Dec. 3, 2012.

(51) Int. Cl.
*H04W 24/00* (2009.01)
*H04B 7/06* (2006.01)
*H04B 7/08* (2006.01)

(52) U.S. Cl.
CPC ........... *H04W 24/00* (2013.01); *H04B 7/0671* (2013.01); *H04B 7/0828* (2013.01); *H04B 7/0874* (2013.01)

(58) Field of Classification Search
CPC .................. H04B 7/024; H04B 7/0671; H04B 7/063; H04B 7/0828; H04B 7/0874;
(Continued)

(56) References Cited

U.S. PATENT DOCUMENTS 7,813,330 B2    10/2010   Yu et al.
7,912,114 B2 *   3/2011   Yang .................... H04B 1/7093
                                                              375/147
(Continued)

FOREIGN PATENT DOCUMENTS

EP    2151937 A1    2/2010
EP    2169863 A1    3/2010
(Continued)

OTHER PUBLICATIONS

Guerrero L., et al., "Performance Analysis of Distributed CDD MC-CDMA Sensor Networks with Frequency-Correlated Subcarriers over Nakagami-m Fading Channels", Vehicular Technology Conference, 2008. VTC Spring 2008, IEEE, IEEE, Piscataway, NJ, USA, May 11, 2008, pp. 81-85, XP031255493, ISBN: 978-1-4244-1644-8.
(Continued)

*Primary Examiner* — Yee Lam
(74) *Attorney, Agent, or Firm* — Silicon Valley Patent Group LLP

(57) ABSTRACT

Systems, apparatus and methods for determining a cyclic shift delay (CSD) mode from a plurality of CSD modes is disclosed. A received OFDM signal is converted to a channel impulse response (CIR) signal in the time domain and/or a channel frequency response (CFR) signal in the frequency domain. Matched filters and a comparator are used to determine a most likely current CSD mode. Alternatively, a classifier is used with a number of inputs including outputs from two or more matched filters and one or more outputs from a feature extractor. The feature extractor extracts features in the time domain from the CIR signal and/or in the frequency domain from the CFR signal useful in distinguishing various CSD modes.

67 Claims, 11 Drawing Sheets

(72) Inventors: Vinay Sridhara, Santa Clara, CA (US);
Xiaoxin Zhang, Sunnyvale, CA (US);
Sundar Raman, Fremont, CA (US);
Gengsheng Zhang, Cupertino, CA (US); Bernal A. Arroyo, Santa Clara, CA (US); Carlos Horacio Aldana, Mountain View, CA (US)

(58) Field of Classification Search
CPC .............. H04B 7/068; H04L 5/0007; H04L 5/006; H04L 27/2607; H04L 5/0044; H04L 27/2647; H04L 27/2626; H04W 72/085; H04W 24/00
See application file for complete search history.

(56) References Cited

U.S. PATENT DOCUMENTS

| | | | |
|---|---|---|---|
| 7,920,599 B1* | 4/2011 | Subramanian et al. | 370/509 |
| 8,144,683 B1 | 3/2012 | Sun et al. | |
| 8,149,942 B1 | 4/2012 | Wang et al. | |
| 8,620,230 B2 | 12/2013 | Sanderovitz et al. | |
| 2002/0126220 A1* | 9/2002 | Wilson et al. | 348/518 |
| 2003/0058952 A1* | 3/2003 | Webster et al. | 375/260 |
| 2005/0047515 A1* | 3/2005 | Walton et al. | 375/267 |
| 2005/0107969 A1 | 5/2005 | Jitsukawa et al. | |
| 2005/0163265 A1 | 7/2005 | Gupta et al. | |
| 2005/0265477 A1 | 12/2005 | Takeda et al. | |
| 2006/0171493 A1* | 8/2006 | Kim | H04L 27/2662 375/343 |
| 2006/0221810 A1 | 10/2006 | Vrcelj et al. | |
| 2007/0165726 A1 | 7/2007 | Ding et al. | |
| 2007/0206686 A1 | 9/2007 | Vook et al. | |
| 2007/0230403 A1* | 10/2007 | Douglas et al. | 370/334 |
| 2007/0270273 A1 | 11/2007 | Fukuta et al. | |
| 2008/0132282 A1 | 6/2008 | Liu et al. | |
| 2009/0116575 A1 | 5/2009 | Hochwald et al. | |
| 2009/0135925 A1* | 5/2009 | Hamaguchi | H04L 5/0026 375/260 |
| 2009/0268685 A1 | 10/2009 | Chen et al. | |
| 2010/0067599 A1 | 3/2010 | Dayal et al. | |
| 2010/0075693 A1* | 3/2010 | Kishigami | H04B 7/0671 455/452.2 |
| 2010/0091915 A1* | 4/2010 | Xu | H04B 7/0671 375/343 |
| 2010/0103810 A1 | 4/2010 | Kloos et al. | |
| 2010/0197264 A1 | 8/2010 | Azadet et al. | |
| 2010/0273438 A1 | 10/2010 | Nishio et al. | |
| 2010/0290553 A1 | 11/2010 | Li et al. | |
| 2011/0075651 A1* | 3/2011 | Jia et al. | 370/344 |
| 2011/0116566 A1* | 5/2011 | Takahashi | H04B 7/0671 375/267 |
| 2011/0117926 A1 | 5/2011 | Hwang et al. | |
| 2011/0142075 A1 | 6/2011 | Che et al. | |
| 2011/0159831 A1 | 6/2011 | Jiang | |
| 2011/0280188 A1 | 11/2011 | Jeon et al. | |
| 2011/0280349 A1 | 11/2011 | Hong et al. | |
| 2011/0305178 A1 | 12/2011 | Zheng et al. | |
| 2012/0057491 A1 | 3/2012 | Tiirola et al. | |
| 2012/0087401 A1 | 4/2012 | Bhattad et al. | |
| 2012/0087427 A1 | 4/2012 | Noh et al. | |
| 2012/0099513 A1* | 4/2012 | Suh | H04B 7/024 370/312 |
| 2012/0177019 A1 | 7/2012 | Zhang | |
| 2013/0121392 A1 | 5/2013 | Thompson et al. | |
| 2013/0128935 A1 | 5/2013 | Janani et al. | |
| 2013/0136198 A1* | 5/2013 | Chavali et al. | 375/260 |
| 2013/0301551 A1* | 11/2013 | Ghosh et al. | 370/329 |
| 2013/0336144 A1 | 12/2013 | Azadet et al. | |
| 2014/0086284 A1 | 3/2014 | Lakhzouri et al. | |
| 2014/0086369 A1 | 3/2014 | Zhang et al. | |
| 2014/0087751 A1 | 3/2014 | Do et al. | |

FOREIGN PATENT DOCUMENTS

| | | |
|---|---|---|
| WO | 2005055543 A1 | 6/2005 |
| WO | 2005081481 A1 | 9/2005 |
| WO | 2008000069 A1 | 1/2008 |
| WO | 2010052673 A1 | 5/2010 |
| WO | 2010124448 A1 | 11/2010 |
| WO | 2011040789 A2 | 4/2011 |

OTHER PUBLICATIONS

Paul T.K., et al., "Evolution, insights and challenges of the PHY layer for the emerging ieee 802.11n amendment", IEEE Communications Surveys, IEEE, New York, NY, US, vol. 11, No. 4, Oct. 1, 2009, pp. 131-150, XP011285647, ISSN: 1553-877X, 001: 10.1109/SURV.2009.090408.

Plass S., et al., "An Overview of Cyclic Delay Diversity and its Applications", Vehicular Technology Conference, 2008. VTC 2008—Fall. IEEE 68th, IEEE, Piscataway, NJ, USA, Sep. 21, 2008, pp. 1-5, XP031352316, ISBN: 978-1-4244-1721-6.

Xu Y., et al., "Sampling Clock Offset Estimation Algorithm Based on IEEE 802. 11n", Networking, Sensing and Control, 2008, ICNSC 2008, IEEE International Conference on, IEEE, Piscataway, NJ, USA, Apr. 6, 2008, pp. 523-527, XP031255223.

Yao X., et al., "An improved channel detection method for IEEE 802.11N MIMO system", Journal of Electronics (China), SP Science Press, Heidelberg, vol. 28, No. 4-6, Mar. 8, 2012, pp. 658-663, XP035024713, ISSN: 1993-0615, DOI: 10.1007/S11767-012-0788-9.

Erceg V., et al., "IEEE P802.11 Wireless LANs, TGn Channel Models", IEEE 802.11-03/940r4, May 10, 2004, pp. 45.

Himayat N., et al., "System Performance of Transmit Diversity Schemes for Interference-Limited Cellular Systems," IEEE Global Telecommunications Conference (GLOBECOM), Nov. 2007, pp. 4215-4220.

"IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput" IEEE Std 802.11n-2009 (Amendment to IEEE Std 802 .11-2007), IEEE Standard, IEEE, Piscataway, NJ, USA, Oct. 29, 2009, pp. 1-565, XP017694836, ISBN: 978-0-7381-6046-7.

Zhou L., et al., "Channel Estimation of Multiple Transmit Antennas for OFDM Systems with Cyclic Delay Preamble," IEEE 62nd Vehicular Technology Conference (VTC), 2005, pp. 583-587.

Cisco, "802.11ac: The Fifth Generation of Wi-Fi," Technical White Paper, Aug. 2012, pp. 1-25.

IEEE P802.11ac/D4.0, Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz., Oct. 2012, 408 pages.

International Search Report and Written Opinion—PCT/US2013/024983—ISA/EPO—Sep. 4, 2013.

Liang, Y.C., et al., "Design of cyclic delay diversity for single carrier cyclic prefix (SCCP) transmissions with block-iterative GDFE (BI-GDFE) receiver", IEEE Transactions on Wireless Communications, IEEE Service Center, Piscataway, NJ, US, vol. 7, No. 2, Feb. 1, 2008, pp. 677-684, XP011225080, ISSN: 1536-1276, DOI:10.1109/TWC.2008.060625 sections III and IV.

Yuen, C., et al., "Comparative Study of Open-Loop Transmit Diversity Schemes for Four Transmit Antennas in Coded OFDM Systems", Vehicular Technology Conference, 2007. VTC—2007 Fall. 2007 IEEE 66th, IEEE, PI, Sep. 1, 2007, pp. 482-485, XP031147450, ISBN: 978-1-4244-0263-2, the whole document.

GSMA, "RCS-e—Advanced Communications: Services and Client Specification," Version 1.2.2, Jul. 2012, 169 pages.

* cited by examiner

CYCLIC SHIFT DELAY DETECTION USING A CLASSIFIER

CROSS-REFERENCE TO RELATED APPLICATIONS

This application is related to U.S. patent application Ser. No. 13/624,653, filed Sep. 21, 2012, and entitled "Cyclic shift delay detection using signaling," the contents of which are incorporated herein by reference.

This application is related to U.S. patent application Ser. No. 13/624,649, filed Sep. 21, 2012, and entitled "Cyclic shift delay detection using autocorrelations," the contents of which are incorporated herein by reference.

This application is related to U.S. patent application Ser. No. 13/624,646, filed Sep. 21, 2012, and entitled "Cyclic shift delay detection using a channel impulse response," the contents of which are incorporated herein by reference.

This application claims the benefit of and priority under 35 U.S.C. §119(e) to U.S. Provisional Application No. 61/732,862, filed Dec. 3, 2012, titled "Cyclic Shift Delay Detection Using a Classifier" to L. Garin, and which is incorporated herein by reference.

BACKGROUND

I. Field of the Invention

To estimate a location, a mobile device may capture received signal strength indication (RSSI) measurements from three or more access points. A server or the mobile device itself may apply trilateration to these RSSI measurements to estimate a position of the mobile device; however, these RSSI measurements have a large standard deviation. Unfortunately, trilateration with such RSSI measurements results in a high level of uncertainty because of the uncertainty of the RSSI measurement levels.

To alleviate high uncertainties associated with RSSI measurements, round-trip time (RTT) measurements may be used. RTT measurements advantageously have a much lower level of uncertainty than the RSSI measurements. RTT measurements record a round-trip time from initiating a signal from the mobile device to an access point and back to the mobile device. Though several uncertainties exist with RTT measurement, these variables may be determined or estimated with less uncertainty that is associated with RSSI measurements. A server or a mobile device may use the RTT measurements in trilateration to more accurately estimate the position of the mobile device.

Recently, Cyclic Shift Diversity (CSD), also known as Cyclic Delay Diversity (CDD), has been introduced into the IEEE 802.11n standard to improve reception by spatial spreading the streams across multiple antennas and transmitting the same signal with different cyclic shifts. With the effects of multiple transmissions and multipath, RTT measurements no longer provide reliable time measurements because of multiple possible start times.

Various CSD modes are defined in the IEEE 802.11n standard. A single-transmitter system does not use cyclic shifting (CSD mode 1). In other words, CSD is disabled when operating in CSD mode 1 and only one transmitter is operating. When two or more transmitters are operating, it is unknown whether a CSD mode is enabled. If cyclic shifting is disabled, identical signals are transmitted from each antenna. Alternatively, if cyclic shifting is enabled, a different time-shifted signal of an original signal is transmitted from each antenna. A similar situation arises with the IEEE 802.11ac standard but different CSD values.

In CSD mode 2, two transmitters transmit different CSD signals: a first transmitter transmits the original signal and a second transmitter transmits a time-shifted signal advanced by 200 ns using cyclic shifting. In CSD mode 3, three transmitters transmit: a first transmitter transmits the original signal, a second transmitter transmits a time-shifted signal advanced by 100 ns, and a third transmitter transmits a signal advanced by an additional 100 ns. In CSD Mode 4, four transmitters transmit: a first transmitter transmits the original signal, a second transmitter advances the signal by 50 ns, a third transmitter advances the signal by an additional 50 ns, and a fourth transmitter advances the signal by another 50 ns for a total of 150 ns from the original signal. More CSD modes may be defined in the future. These CSD modes are recommendations and not requirements. A specific manufacturer is free to utilized non-standard implementations. As such, a non-standard CSD mode may be defined base on a number of transmitters (e.g., 2, 3 or 4 transmitters) along with a temporal spacing (e.g., 50 ns, 100 ns, 150 ns, 200 ns).

As a result, RTT measurements may be skewed with false positive signals when CSD is enabled if timing is measured with a shifted signal. Alternatively, multipath may appear as a multi-transmitter CSD mode signal when in fact CSD is disabled and only a signal transmitter is used. Without some other detection and correction processing, RTT measurements may select a first-to-arrive signal (having a transmitter advanced signal using cyclic shifting from a second or subsequent transmitter) rather than the last transmission (from the first transmitter without a shifted signal).

Therefore, what is needed is a way to determine if CSD is enabled. Also, if enabled, what CSD mode is operational, thereby providing accurate RTT measurement that may be used for mobile device positioning.

BRIEF SUMMARY

This disclosure relates generally to apparatus and methods for mobile positioning, and more particularly to determining final transmission in a cyclic-shift diversity (CSD) signaling mode.

According to some aspects, disclosed is a method in a mobile device for determining a cyclic shift delay (CSD) mode from a plurality of CSD modes, the method comprising: receiving an orthogonal frequency division multiplex (OFDM) signal; computing a channel impulse response (CIR) of the OFDM signal; match filtering the CIR with a first CSD mode from the plurality of CSD modes to produce a first output; match filtering the CIR with a second CSD mode from the plurality of CSD modes to produce a second output; and determining the CSD mode from a maximum of the first output and second output.

According to some aspects, disclosed is a method in a mobile device for determining a cyclic shift delay (CSD) mode from a plurality of CSD modes, the method comprising: receiving an orthogonal frequency division multiplex (OFDM) signal; computing a channel impulse response (CIR) of the OFDM signal; match filtering the CIR with a first CSD mode from the plurality of CSD modes to produce a first output; match filtering the CIR with a second CSD mode from the plurality of CSD modes to produce a second output; coupling the first output and the second output to a classifier; and determining the CSD mode from a maximum of the classifier.

According to some aspects, disclosed is a method in a mobile device for determining a cyclic shift delay (CSD) mode from a plurality of CSD modes, the method comprising: receiving an orthogonal frequency division multiplex (OFDM) signal; converting I/Q samples to a channel frequency response (CFR); extracting a first feature in the frequency domain for a CSD mode 2 signal from the CFR to produce a first extracted frequency-domain feature; providing the first extracted frequency-domain feature to the classifier; and determining the CSD mode from a maximum of the classifier.

According to some aspects, disclosed is a mobile device for determining a cyclic shift delay (CSD) mode from a plurality of CSD modes, the mobile device comprising: a channel impulse response (CIR) unit to determine a CIR of a received orthogonal frequency division multiplex (OFDM) signal; a first matched filter coupled to an output of the CIR unit, the first matched filter to match filter the CIR with a first CSD mode from the plurality of CSD modes to produce a first output; a second matched filter coupled to the output of the CIR unit, the second matched filter to match filter the CIR with a second CSD mode from the plurality of CSD modes to produce a second output; and a comparator with inputs coupled to the first output and the second output, the comparator to determine the CSD mode from a maximum of the first output and second output.

According to some aspects, disclosed is a mobile device for determining a cyclic shift delay (CSD) mode from a plurality of CSD modes, the mobile device comprising: a channel impulse response (CIR) unit to determine a CIR of a received orthogonal frequency division multiplex (OFDM) signal; a first matched filter coupled to an output of the CIR unit, the first matched filter to match filter the CIR with a first CSD mode from the plurality of CSD modes to produce a first output; a second matched filter coupled to the output of the CIR unit, the second matched filter to match filter the CIR with a second CSD mode from the plurality of CSD modes to produce a second output; and a classifier with inputs coupled to the first output and the second output, the classifier to determine the CSD mode from a maximum of the first output and second output.

According to some aspects, disclosed is a mobile device for determining a cyclic shift delay (CSD) mode from a plurality of CSD modes, the mobile device comprising: a fast Fourier transform (FFT) unit to receive an orthogonal frequency division multiplex (OFDM) signal; a first frequency-domain feature extractor having an input coupled to the FFT unit and an output to produce a first frequency-domain extracted feature; and the classifier with an input coupled to the output, the classifier to determine the CSD mode from a maximum of the first output and second output.

According to some aspects, disclosed is a mobile device for determining a cyclic shift delay (CSD) mode from a plurality of CSD modes, the mobile device comprising: means for receiving an orthogonal frequency division multiplex (OFDM) signal; means for computing a channel impulse response (CIR) of the OFDM signal; means for match filtering the CIR with a first CSD mode from the plurality of CSD modes to produce a first output; means for match filtering the CIR with a second CSD mode from the plurality of CSD modes to produce a second output; and means for determining the CSD mode from a maximum of the first output and second output.

According to some aspects, disclosed is a mobile device for determining a cyclic shift delay (CSD) mode from a plurality of CSD modes, the mobile device comprising: means for receiving an orthogonal frequency division multiplex (OFDM) signal; means for computing a channel impulse response (CIR) of the OFDM signal; means for match filtering the CIR with a first CSD mode from the plurality of CSD modes to produce a first output; means for match filtering the CIR with a second CSD mode from the plurality of CSD modes to produce a second output; means for coupling the first output and the second output to a classifier; and means for determining the CSD mode from a maximum of the classifier.

According to some aspects, disclosed is a mobile device for determining a cyclic shift delay (CSD) mode from a plurality of CSD modes, the mobile device comprising: means for receiving an orthogonal frequency division multiplex (OFDM) signal; means for converting I/Q samples to a channel frequency response (CFR); means for extracting a first feature in the frequency domain for a CSD mode 2 signal from the CFR to produce a first extracted frequency-domain feature; means for providing the first extracted frequency-domain feature to the classifier; and means for determining the CSD mode from a maximum of the classifier.

According to some aspects, disclosed is a non-volatile computer-readable storage medium for determining a cyclic shift delay (CSD) mode from a plurality of CSD modes, the non-volatile computer-readable storage medium including program code stored thereon, the program code, when executed by a processor, comprising code for: receiving an orthogonal frequency division multiplex (OFDM) signal; computing a channel impulse response (CIR) of the OFDM signal; match filtering the CIR with a first CSD mode from the plurality of CSD modes to produce a first output; match filtering the CIR with a second CSD mode from the plurality of CSD modes to produce a second output; and determining the CSD mode from a maximum of the first output and second output.

According to some aspects, disclosed is a non-volatile computer-readable storage medium for determining a cyclic shift delay (CSD) mode from a plurality of CSD modes, the non-volatile computer-readable storage medium including program code stored thereon, the program code, when executed by a processor, comprising code for: receiving an orthogonal frequency division multiplex (OFDM) signal; computing a channel impulse response (CIR) of the OFDM signal; match filtering the CIR with a first CSD mode from the plurality of CSD modes to produce a first output; match filtering the CIR with a second CSD mode from the plurality of CSD modes to produce a second output; coupling the first output and the second output to a classifier; and determining the CSD mode from a maximum of the classifier.

According to some aspects, disclosed is a non-volatile computer-readable storage medium for determining a cyclic shift delay (CSD) mode from a plurality of CSD modes, the non-volatile computer-readable storage medium including program code stored thereon, the program code, when executed by a processor, comprising code for: receiving an orthogonal frequency division multiplex (OFDM) signal; converting I/Q samples to a channel frequency response (CFR); extracting a first feature in the frequency domain for a CSD mode 2 signal from the CFR to produce a first extracted frequency-domain feature; providing the first extracted frequency-domain feature to the classifier; and determining the CSD mode from a maximum of the classifier.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
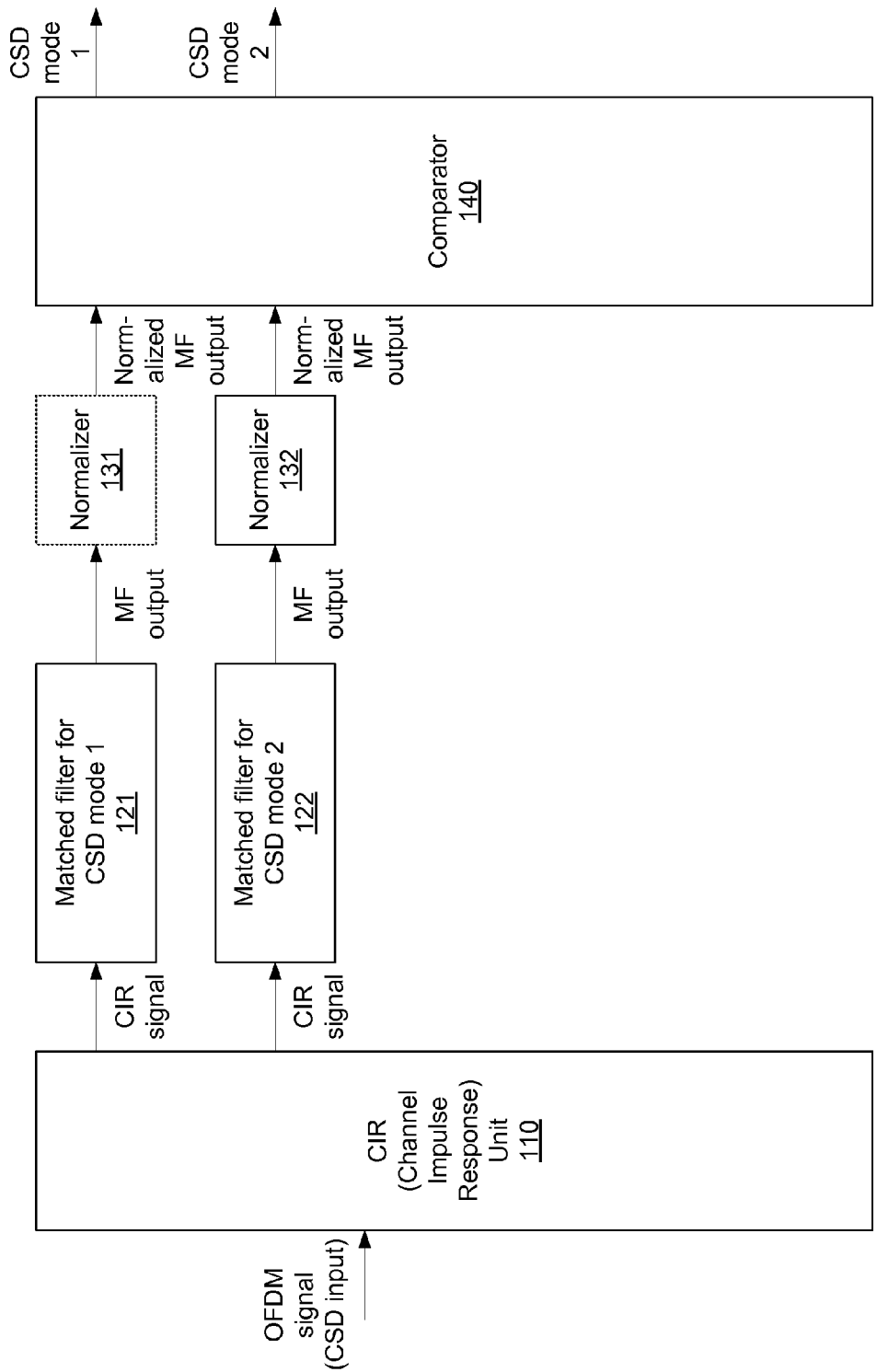
FIG. 1 shows a mobile device for determining a cyclic shift delay (CSD) mode from a plurality of CSD modes having two matched filters and using a comparator, in accordance with some embodiments of the present invention.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device" or "device."

The following sections specifically describe the IEEE 802.11n standard, but the concept is also applicable to the IEEE 802.11ac standard and future IEEE standards also applying CSD. As previously stated, a first CSD mode (CSD mode 1) disables CSD and transmits its OFDM signal as a reference signal from a reference antenna. Only one transmit antenna is used. Transmit diversity may be used to transmit an identical signal from more than one antenna. At a receiver, a receiver may receive multiple copies of the transmitted signal from multipath and/or transmit diversity.

A second CSD mode (CSD mode 2) enables CSD and uses two transmit chains: one chain to transmit the reference signal from the reference antenna and a second chain to transmit a CSD signal from a first CSD antenna that is cyclically advanced by 200 ns. Two antennas are used to transmit.

A third CSD mode (CSD mode 3) enables CSD and uses three transmit chains: one chain to transmit the reference signal from the reference antenna; a second chain to transmit a CSD signal from a first CSD antenna that is cyclically advanced by 100 ns; and a third chain to transmit a CSD signal from a second CSD antenna that is cyclically advanced by 200 ns. Three antennas are used to transmit.

A fourth CSD mode (CSD mode 4) enables CSD and uses four transmit chains: one chain to transmit the reference signal from the reference antenna; a second chain to transmit a CSD signal from a first CSD antenna that is cyclically advanced by 50 ns; a third chain to transmit a CSD signal from a second CSD antenna that is cyclically advanced by 100 ns; and a fourth chain to transmit a CSD signal from a third CSD antenna that is cyclically advanced by 150 ns. In all, four antennas are used to transmit.

The systems, methods and devices below describe determining a CSD mode at the receiver by analyzing a received OFDM signal.

FIG. 1 shows a mobile device for determining a cyclic shift delay (CSD) mode from a plurality of CSD modes having two matched filters 121, 122 and using a comparator 140, in accordance with some embodiments of the present invention. The mobile device includes a channel impulse response (CIR) unit 110, two matched filters (a first matched filter 121 for CSD mode 1 and a second matched filter 122 for CSD mode 2), two normalizers (a first normalizer 131 and a second normalizer 132), and a comparator 140.

The CIR unit 110 determines a CIR of the received orthogonal frequency division multiplex (OFDM) signal. In some embodiments, the resolution of the equivalent raw CIR is 50 ns. Since the smallest CSD temporal spacing is equal to 50 ns, this resolution allows reliable identification of the proper CSD mode difficult. The hardware may deliver the channel frequency response (CFR) that is assumed to be flat over a total bandwidth of 20 MHz. Therefore, an up-sampling operation may be used. Up-sampling may be performed in the frequency domain and converted to time domain through an inverse fast Fourier transform (IFFT). Before the IFFT operation in some embodiments, a Hanning window weighting is applied to reduce ringing effects at the boundaries of the frequency response. For example, a processor may compute a 256-point Hanning window set of coefficients defined as $w(n)=0.5 \cdot (1-\cos(2\pi n/(N-1)))$, where n ranges between [0, 255] and N=256. Each term of the CFR may be multiplied by the corresponding Hanning window coefficient $w(n)$. The processor then performs the IFFT resulting in time-domain up-sampled CIR $c_f(n)$, where n=0, 1, ..., 255. For example, a 64-point IFFT may be used based on computational complexity.

A raw channel dump of the OFDM signal is captured in the frequency domain, which has a CFR of known tones. In some embodiments, the CFR corresponds to a complex-valued CIR computed across 64 samples for 3.2 microseconds (μs), as proposed by the IEEE standard, at a sampling interval of 50 nanoseconds (ns), or a clock of 20 MHz. The CFR may be expanded from known tones to all tones, using linear interpolation for DC tones and zero padding for edge tones. In some embodiments, pilot tones are linearly interpolated while zero padding is applied to edge tones. The CFR may be up-sampled up to four times of the bandwidth in the frequency domain using a raised cosine filter, followed by an IFFT to end with time a domain up-sampled CIR signal.

In one embodiment, this CIR signal is then followed by a bank of two or more matched filters 121, 122 each corresponding to different CSD modes outlined above. The maximum of a correlation output from the matched filters 121, 122 are normalized by a corresponding normalizer 131, 132. The comparator 140 makes a CSD mode decision on the largest normalized matched filter output.

Each matched filter 121, 122 performs a correlation of the input CIR signal with the one of four types of Dirac delta signals. Note, CSD mode 1 is a trivial correlation. Matched filter 122 for the other CSD modes involve picking the samples of the CIR at the correct locations (based on the CSD mode) and summing them appropriately. All correlations below correspond to circular correlation (i.e., samples are wrapped back to the front of the signal). The matched filter 121, 122 may provide a complex output that is provided as an output or a magnitude of the complex value may be provided as the output. If an array of values is provided as an output from the matched filter 121, 122, a maximum value, complex or real, may be provided as the output of the matched filter 121, 122.

For a single Dirac representing CSD mode 1 with a delta of amplitude 1.0, the output of matched filter 121 may be the same as the input, which is $r_2(n)=c_f(n)$ $r_1(n)=c_f(n)$ for n=0, 1, ..., 255.

For two Dirac delta representing CSD mode 2, each of amplitude 1.0, at 0 ns and 200 ns, the output of matched filter 122 may be the sum of the input and "offset input" where the "offset input" is the input offset by 16 samples corresponding to 200 ns at a four times up-sampling rate, where $r_2(n)=c_f(n_1)+c_f(n_2)$ with $n_1=0, 1, \ldots, 255$ and $n_2=\mod(n_1-16,N)$ where N=256.

For three Dirac delta, each of amplitude 1.0, at 0 ns, 100 ns and 200 ns, the output of the matched filter 122 may be the sum of the input, "offset_input1" and "offset_input2", where the "offset_input1" and "offset_input2" are the inputs offset by 8 samples and 16 samples corresponding to 100 ns and 200 ns delays, respectively, at four times up-sampling, where $r_3(n)=c_f(n_1)+c_f(n_2)+c_f(n_3)$ and with $n_1=0, 1, \ldots, 255$ $n_2=\mod(n_1-8,N)$ and $n_3=\mod(n_1-16,N)$, where N=256.

A confidence number computation may associate a confidence value to the matched filter/normalization/comparison process described herein. If the CSD mode is not mode 1 (i.e., the CIR signal has more than one peak), the spacing between peaks is measured and a confidence number is computed depending on the discrepancy between nominal spacing and observed spacing.

In other embodiment, the comparator 140 is replaced be a classifier 160, which is fed by the matched filters 121, 122 and also a feature extractor. The outputs of the classification process in the classifier 160 may be: (1) a CSD mode decision; (2) a confidence parameter (e.g., between 0 and 1 where 1 is an absolutely surety of the selected CSD mode and 0 is no guarantee or certainty); and (3) the interpolated delay position of the reference peak.

The mobile device also includes a first matched filter 121 coupled to an output of the CIR unit 110. The first matched filter 121 matches the CIR with a first CSD mode from the plurality of CSD modes to produce a first output. The first CSD mode may be CSD mode 1 having a single peak in its CIR.

The CSD modes (i.e., number of transceiver chains), will belong to one of CSD mode 1, CSD mode 2, CSD mode 3 or CSD mode 4. Unfortunately, the actual mode may not be known a priori. CSD mode 4 exists in the IEEE standard but CSD mode 4 is effectively currently eliminated and not implemented commercially yet. Therefore, some embodiments operate with just CSD modes 1-3. Some transceivers only have two chains. Therefore, these embodiments may operate with just CSD modes 1 and CSD mode 2. Various non-standard CSD modes and future IEEE modes may be added as well. When CSD is disabled (i.e., CSD mode 1), only a reference chain transmits a signal. When CSD is enabled (e.g., CSD modes 2-4), CSD chains are transmitting earlier than the reference chain. The device helps to distinguish between the various chains. That is, the following algorithm determines a probable CSD mode and the correct time offset by converting the received OFDM signal into a CIR signal and examining the CIR signal. By finding the correct CSD mode and thus the correct time offset, round-trip time (RTT) measurements may be correctly made. In each CSD mode case, the reported RTT should be calculated against the reference chain (i.e., the last chain or the chain not cyclically advanced in time).

The device also includes a second matched filter 122 also coupled to the output of the CIR unit 110. The second matched filter 122 matches the CIR with a second CSD mode from the plurality of CSD modes to produce a second output. The second CSD mode may be CSD mode 2 with two peaks in its CIR signal.

The device also includes a comparator 140 with inputs coupled to the first output and the second output. Comparator 140 determines the CSD mode from a maximum of the first output and second output. For example, if the greatest signal comes from the first matched filter 121, then CSD mode 1 is selected as the current CSD mode.

In some embodiments, the device further includes one or more normalizers coupled to receive an output from the matched filter 121, 122 and to provide an output to the comparator 140. The normalizer 131, 132 makes the outputs from the matched filters 121, 122 equivalent. For example, a maximum value of each matched filter 121, 122 is normalized to unity. When a CSD mode 1 signal is applied to the device, the value of the first matched filter 121 is one and the other matched filter(s) 122 each produce a value of less than one. When a CSD mode 2 signal is applied to the device, the value of the second matched filter 122 is one and the other matched filter(s) 121 each produce a value of less than one. Either a theoretical or analytical value may be used to set the normalizer(s) 131, 132. For example, a first training signal using CSD mode 1 may be applied to the device to set a first normalizer 131 following the first matched filter 121. A second training signal using CSD mode 2 may be applied to the device to set a second normalizer 132 following the second matched filter 122. Each normalizer 131, 132 may be tuned in such a manner.

Figure 2:
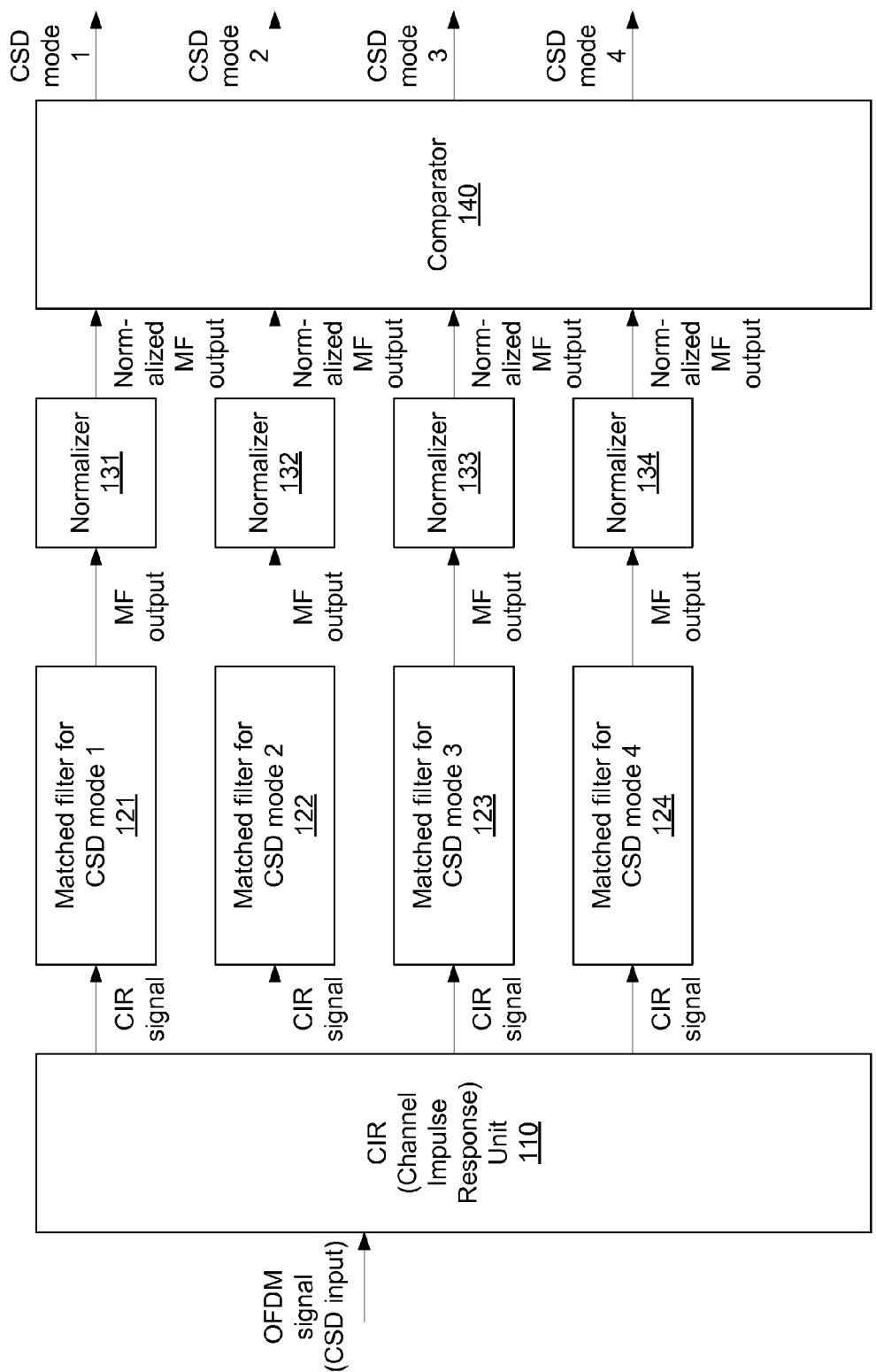
FIG. 2 shows a mobile device of FIG. 1 having two additional matched filters, in accordance with some embodiments of the present invention.

FIG. 2 shows a mobile device of FIG. 1 having two additional matched filters 123, 124, in accordance with some embodiments of the present invention. The device includes a third matched filter 123 coupled to the output of the CIR unit 110. The third matched filter 123 matches the CIR with a third CSD mode from the plurality of CSD modes to produce a third output. The third CSD mode may be CSD mode 3 with three peaks in its CIR signal. Some embodiments include three matched filters while others include four matched filters. The device shown includes a fourth matched filter 124 coupled to the output of the CIR unit 110. The fourth matched filter 124 matches the CIR with a fourth CSD mode from the plurality of CSD modes to produce a fourth output. The fourth CSD mode may be CSD mode 4 with four peaks in its CIR signal.

The comparator 140 of FIGS. 1 and 2 may be replaced by a classifier 160 that is trained a priori with known signals. FIGS. 3-15 show such embodiments of a device having a classifier 160.

Figure 3:
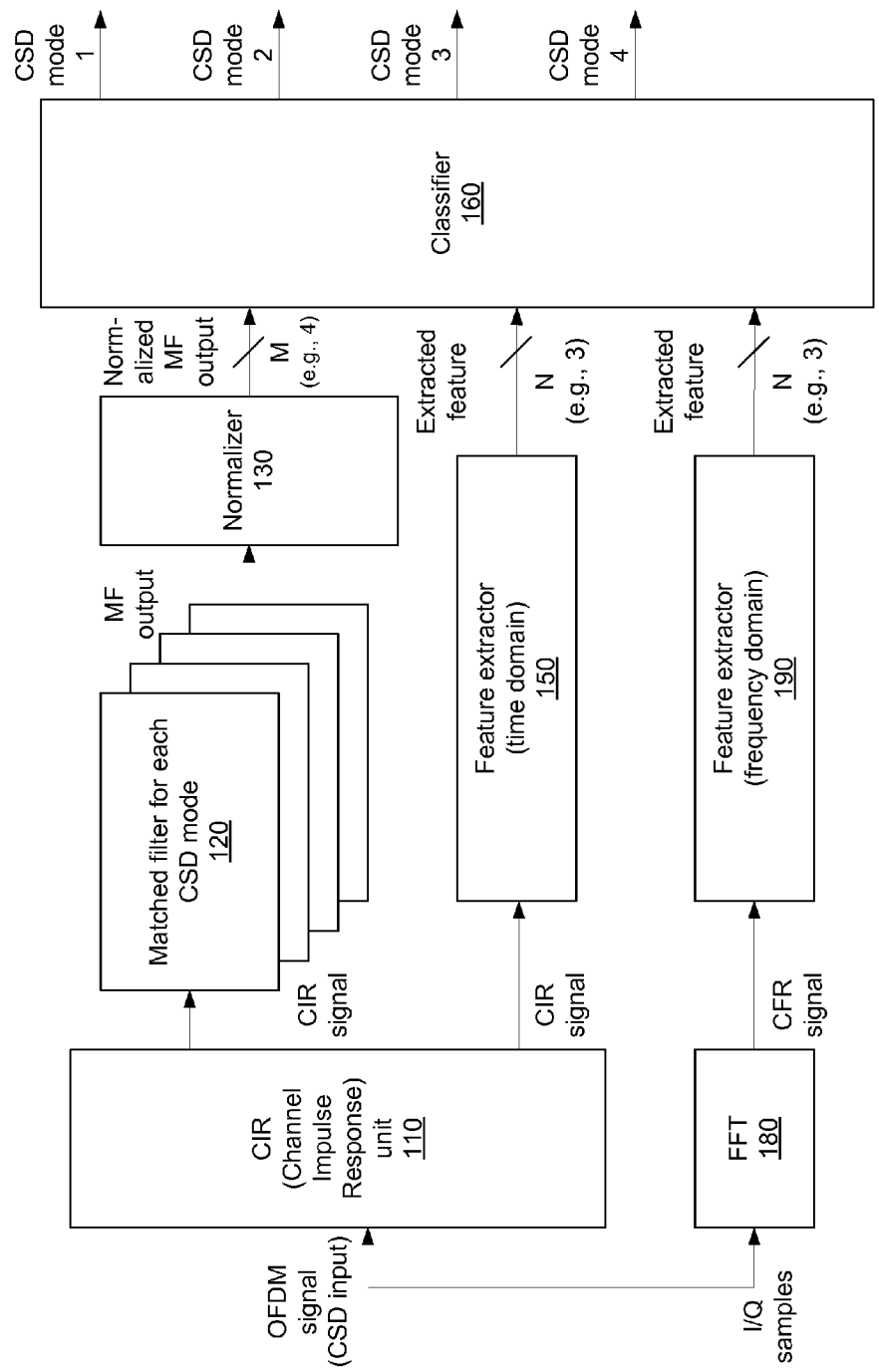
FIG. 3 shows a mobile device for determining a cyclic shift delay (CSD) mode from a plurality of CSD modes having a feature extractor and using a classifier, in accordance with some embodiments of the present invention.

FIG. 3 shows a mobile device for determining a cyclic shift delay (CSD) mode from a plurality of CSD modes having feature extractor(s) 150, 190 and using a classifier 160, in accordance with some embodiments of the present invention. As before, the mobile device includes a CIR unit 110 and two, three or four matched filters 121, 122, 123, 124. Also, one or more of the outputs of the matched filters 121, 122, 123, 124 may be normalized with a corresponding normalizer 130 (specifically a first normalizer 131, a second normalizer 132, a third normalizer 133 and a fourth normalizer 134), as described above with reference to normalizers 131 and 132. Each output from the matched filters 121, 122, 123, 124 and/or normalized output from the normalizers 131, 132, 133, 134 is provided to the classifier 160.

The device contains a CIR unit 110, multiple matched filters 120 (one for each CSD mode), one or more nomalizers 130 and a classifier 160. The device may also contain a time-domain feature extractor 150 and/or a FFT module 180 with a frequency-domain frequency extractor 190. The CIR unit 110 feeds the matched filters 120 and normalizers 130, as described above. The time-domain feature extractor 150 also receives a CIR signal in the time domain. The time-domain feature extractor 150 analysis the time-domain CIR signal to extract features for each CSD mode (e.g., CSD modes 2-4).

Alternatively, the device may contain a FFT module 180 with a frequency-domain frequency extractor 190 and a classifier 160 but no CIR unit 110, matched filters 120 and nomalizers 130. For example, a mobile device may determine a cyclic shift delay (CSD) mode from a plurality of CSD modes. First, the mobile device receives an orthogonal frequency division multiplex (OFDM) signal and converts I/Q samples from the OFDM signal to a channel frequency response (CFR). Using the frequency-domain frequency extractor 190, the mobile device then extracts a first feature in the frequency domain for a CSD mode 2 signal from the CFR to produce a first extracted frequency-domain feature. The mobile device then provides the first extracted frequency-domain feature to the classifier and determines the CSD mode from a maximum of the classifier. Additionally, the mobile device may extract a second feature in the frequency domain for a CSD mode 3 signal from the CFR to produce a second extracted frequency-domain feature and provide the second extracted frequency-domain feature to the classifier. Furthermore, the mobile device may extract a third feature in the frequency domain for a CSD mode 4 signal from the CFR to produce a third extracted frequency-domain feature where the mobile device provides the third extracted frequency-domain feature to the classifier. More features may be extracted from the frequency domain signal and provided to the classifier.

An FFT module 180 accepts the I/Q samples and transforms the time-domain OFDM signal to a frequency-domain CFR signal. The frequency-domain feature extractor 190 extracts frequency-domain features. The normalizer(s) 130, the time-domain feature extractor 150 and the frequency-domain feature extractor 190 each provide their extracted features to the classifier 160. The classifier 160 provides a signal for each CSD mode. The device may select a maximum of the output CSD mode signals to determine the current CSD mode as determined by the classifier 160.

In some embodiments, a mobile device includes a time-domain feature extractor 150 but not a frequency-domain feature extractor 190. In some embodiments, a mobile device does not include a time-domain feature extractor 150 but does include a frequency-domain feature extractor 190. In some embodiments, a mobile device includes both a time-domain feature extractor 150 and a frequency-domain feature extractor 190. The frequency extractors 150 and 190 each provide up to one extracted feature per active CSD mode.

The classifier 160 is a learning classifier system that is trained a priori to define generalized relationships for different classes, where the different classes are the various CSD modes. During training, inputs to the classifier 160 include a plurality of extracted features and an identification of the current known CSD mode. During operation, inputs to the classifier 160 include just the plurality of extracted features. The output of the classifier 160 identifies the "guess" at the current CSD mode that the device is receiving. The current CSD mode is important in determining distance to a transmitter using RTT. Without knowing the current CSD mode, the received OFDM signal may appear as a multipath signal and an incorrect "path" may be selected to determine the path delay. The plurality of extracted features includes output of the two or more matched filters 121, 122, 123, 124 as well as one or more outputs from a feature extractor. The feature extractor is defined in more detail below.

Figure 4:
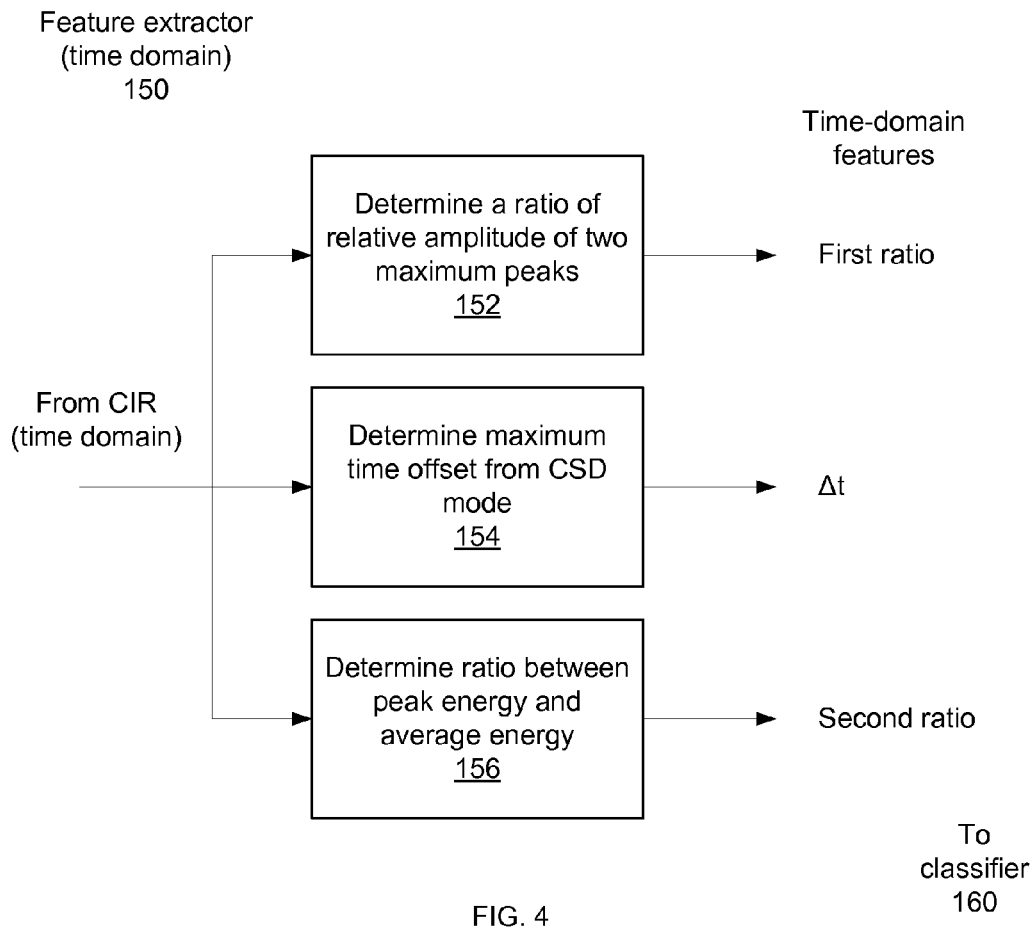
FIG. 4 illustrates a time-domain feature extractor of FIG. 3, in accordance with some embodiments of the present invention.
Figure 5:
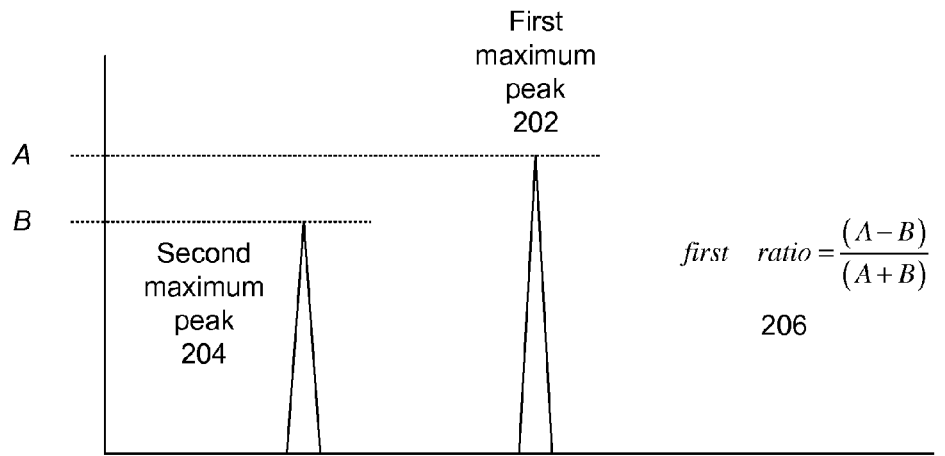
FIGS. 5-10 illustrate various features extracted from a channel impulse response (CIR) signal in the time domain, in accordance with some embodiments of the present invention.

FIG. 4 illustrates a time-domain feature extractor of FIG. 3, in accordance with some embodiments of the present invention. A time-domain feature extractor 150 may provide one, two, three or more extracted features by considering a time-domain signal, such as the CIR. In general, an extracted feature separates two or more classes or groups of classes from each other. Features found to be relevant at separating classes or groups of classes include one or more of the following time-domain features: (1) a function of two maximum peaks from module 152; (2) a maximum time offset Δt from a CSD mode from module 154; and (3) a function of the peak energy and the average energy from module 156.

The module 152 determines a ratio of relative amplitudes of two maximum peaks. A function of two maximum peaks may include determining a first ratio comprising first determining two maximum peaks in a CIR signal then determining the relative amplitude or the like of the two maximum peaks. An output signal of module 152 is a first ratio. More is described with reference to FIG. 5.

The module 154 determines a maximum time offset from a CSD mode. A maximum time offset Δt from a CSD mode compares a valid CSD mode to what OFDM signal is actually received. That is, a time spacing of a received signal is converted to a CIR signal and compared to a time spacing of allow CSD modes (e.g., 50 ns, 100 ns and 200 ns). More is described with reference to FIGS. 6-10.

The module 156 determines a ratio between a peak energy and an average energy. A function of the peak energy and the average energy may include a second ratio comprising computing the peak energy, computing the average energy, and determining a ratio between the peak energy and the average energy. The peak energy and the average energy differ among the different classes (or equivalently, the define CSD modes). The second ratio may be defined as (A−B)/(A+B) where A is the peak energy and B is the average energy. Alternatively, second ratio may be defined as A/B where A is the peak energy and B is the average energy. Alternatively, second ratio may be defined as A−B where A is the peak energy and B is the average energy.

FIGS. 5-10 illustrate various features extracted from a channel impulse response (CIR) signal in the time domain, in accordance with some embodiments of the present invention. A CIR signal may have one, two, three or more dominant peaks. In the example shown, a CIR signal has two dominant peaks (a first maximum peak and a second maximum peak). Let A represent the first maximum peak and let B represent the second maximum peak. The first ratio may be defined as (A−B)/(A+B), A/B or A−B.

Figure 6:
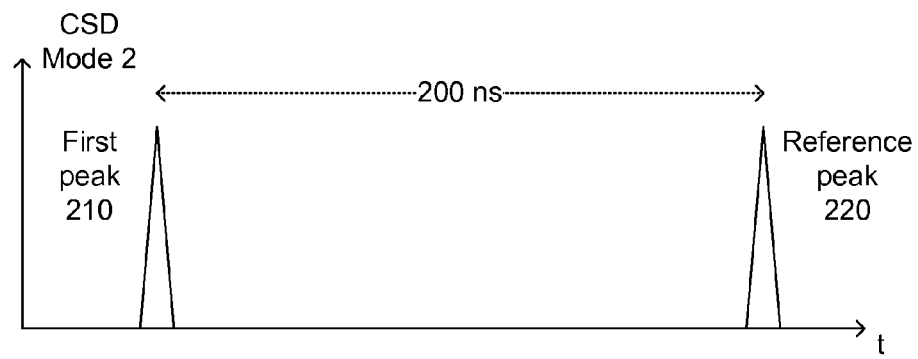
Figure 7:
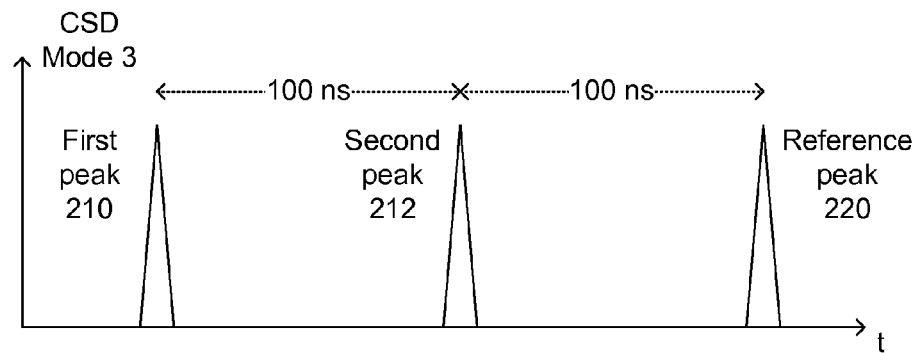
Figure 8:
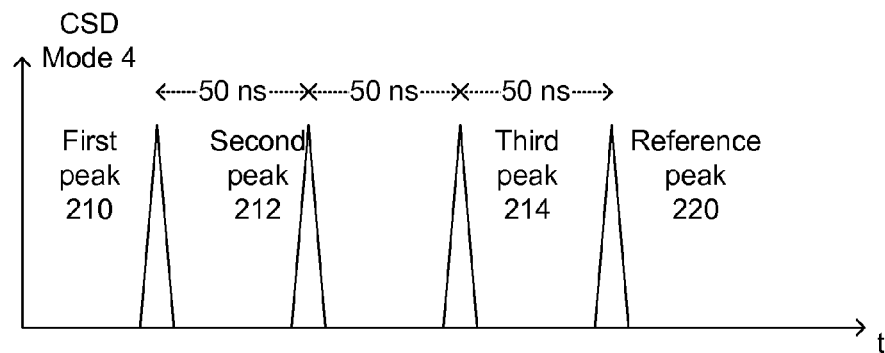

For reference FIGS. 6, 7 and 8 show CIR signals as defined from CSD mode 2, 3 and 4, respectively. In FIG. 6, a CSD mode 2 signal shows a CIR having two maximum peaks corresponding to two transmitted signals: one version of a reference signal cyclically advanced by 200 ns and an original version of the reference signal left unshifted. As shown, the first peak 210 is received at an earlier time than the reference peak 220.

In FIG. 8, a CSD mode 4 signal shows a CIR having four maximum peaks corresponding to four transmitted signals, each peak separated by 50 ns from the next peak where: one version of a reference signal cyclically advanced by 150 ns (first peak 210), a second version of the reference signal cyclically advanced by 100 ns (second peak 212), a third version of the reference signal cyclically advanced by 50 ns (third peak 214) and an original version of the reference signal 220 left unshifted.

Figure 9:
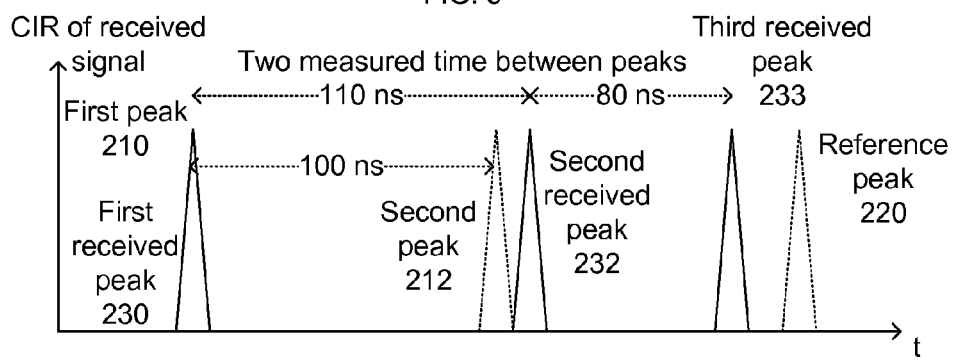

FIG. 9 illustrates a CIR of a received signal (having a variable temporal spacing of 110 ns between a first received peak 230 and a second received peak 232, and 80 ns between the second received peak 232 and a third received peak 234) being compared to defined CSD mode 3 signal. The defined CSD mode 3 signal also has three peaks: a first peak 210, a second peak 212 and a third peak or reference peak 220. The first peak 210 is shown corresponding in time with the first received peak 230. The first, second and third peaks 210, 212, 220 have a defined fixed temporal spacing of 100 ns between peaks.

In the case of the received signal, a first spacing is 110 ns, which is 10 ns from the 100 ns of the defined CSD mode 3 signal, and a second spacing is 80 ns, which is 20 ns from the 100 ns of the defined CSD mode 3 signal. The greater of 10 ns and 20 ns may be selected as an extracted feature; and therefore, 20 ns is provided as from module 154 as the maximum time offset Δt. Alternatively, both 10 ns and 20 ns may both be selected as extracted features provided to classifier 160.

Figure 10:
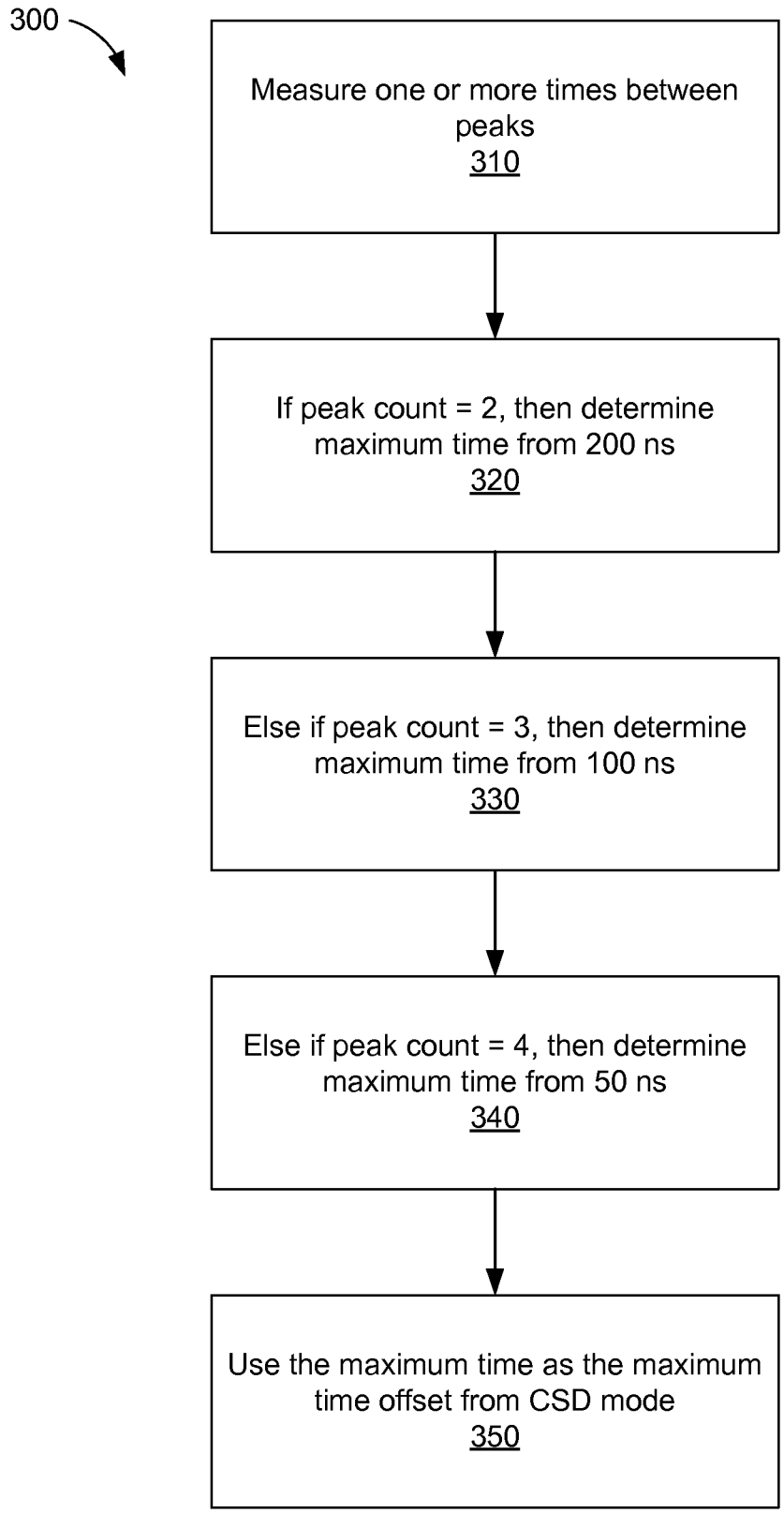

FIG. 10 shows a method 300 to determine the maximum time offset Δt from a CSD mode by module 154. At step 310, a processor counts a number of peaks and measures a time between each pair of neighboring peaks. At step 320, if the number of peaks is two (presume CSD mode 2), then compare the measured time between peaks to 200 ns. Else at step 330, if the number of peaks is three (presume CSD mode 3), then compare the two measured times between peaks to 100 ns. Select the greater of the two differences. Alternatively, select the average of the two differences. Alternatively, select the minimum of the two differences. Else at step 340, if the number of peaks is four (presume CSD mode 4), then compare the three measured times between peaks to 50 ns. Select the greater of the three differences. Alternatively, select the average of the three differences. Alternatively, select the minimum of the three differences. At step 350, use the selected maximum time as the maximum time offset Δt from a define CSD mode at module 154.

Figure 11:
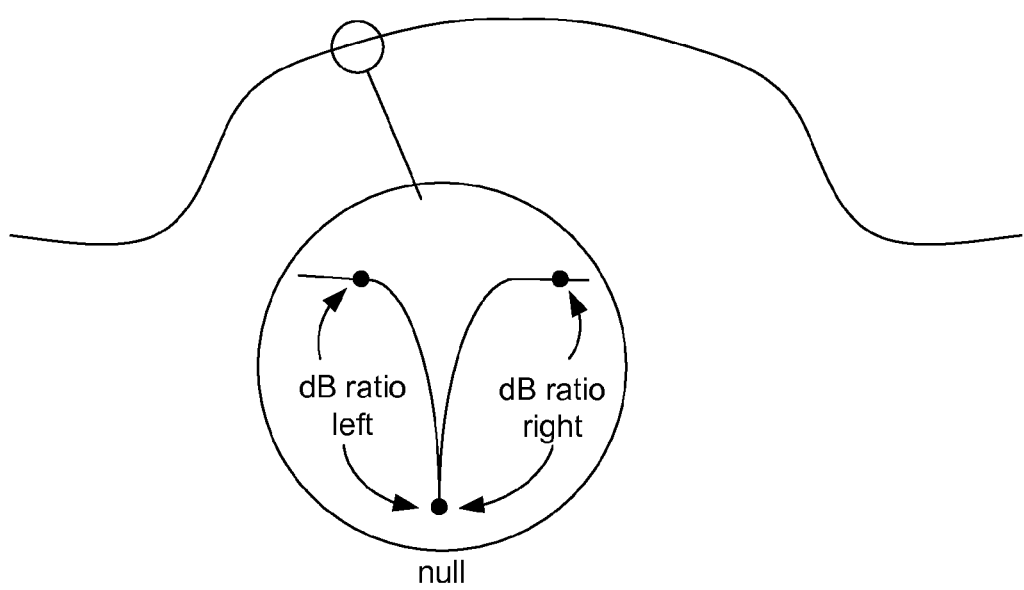
FIGS. 11-15 show feature extraction in the frequency domain, in accordance with some embodiments of the present invention.

FIGS. 11-15 show feature extraction in the frequency domain, in accordance with some embodiments of the present invention. FIG. 11 shows a frequency spectrum of an OFDM signal. Under close examination, the OFDM signal may have one or more nulls in the frequency domain. A ratio comparing the amplitude of the null to a sub-channel to the right or left may be used to show how deep the nulls is in the frequency spectrum. The ratio may constitute a dB value of a right or left sub-channel over a dB value at the null sub-channel.

Figure 12:
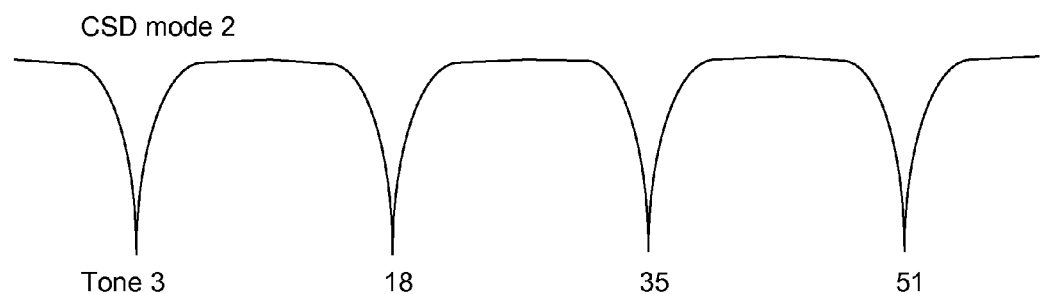
Figure 13:
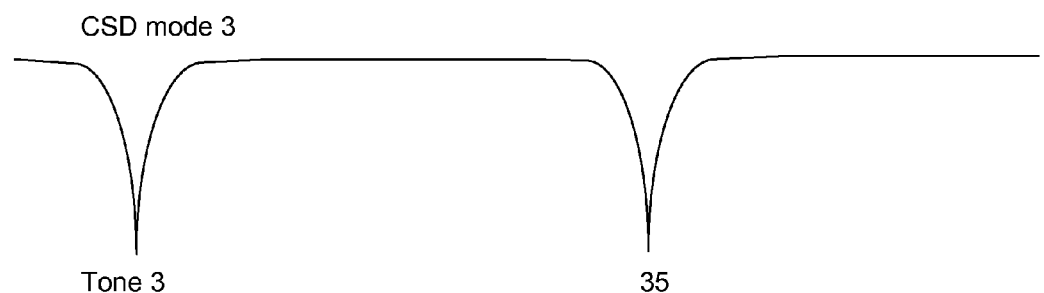
Figure 14:

FIG. 12 shows a frequency spectrum of an OFDM signal operating with CSD mode 2 signaling. Nulls exist at sub-channels or frequency tones 3, 18, 35 and 51. FIG. 13 shows a frequency spectrum of an OFDM signal transmitted operating with CSD mode 3 signaling. Nulls exist at frequency tones 3 and 35. FIG. 14 shows a frequency spectrum of an OFDM signal operating with CSD mode 4 signaling. Nulls exist at frequency tone 3.

Figure 15:
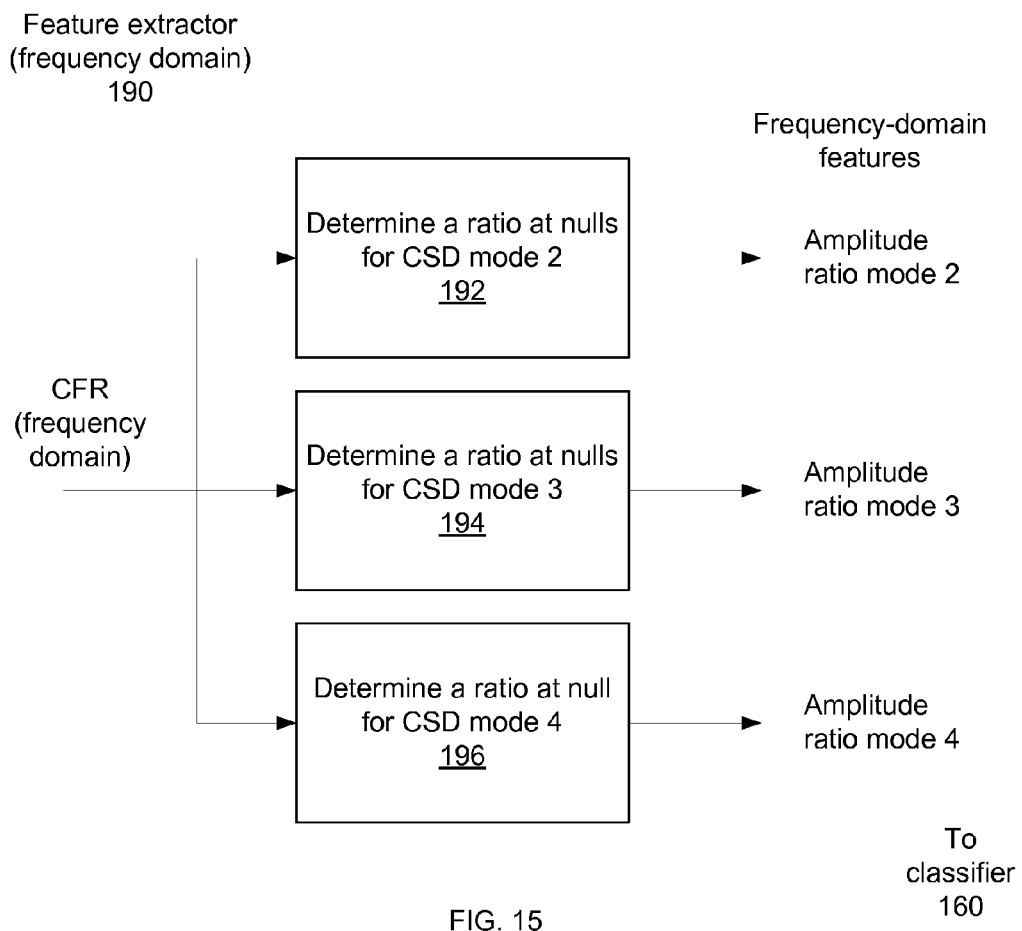

FIG. 15 shows a frequency-domain feature extractor 190. Module 192 receives a frequency-domain CFR signal and determines a ratio for the four nulls expected for a CSD mode 2 signal. The ratio may be between an amplitude (in dB) of a sub-channel to the right and/or left of the null and an amplitude (in dB) of the null. Module 192 may provide the maximum ratio, the minimum ratio or an average ratio. Alternatively, module 192 may provide all four ratios to the classifier 160.

Module 194 similarly receives a frequency-domain CFR signal and determines a ratio for the two nulls expected for a CSD mode 3 signal. Module 194 may provide the maximum ratio, the minimum ratio or an average ratio. Alternatively, module 194 may provide both ratios to the classifier 160. Module 196 receives a frequency-domain CFR signal and determines a ratio for the one null expected for a CSD mode 4 signal.

Figure 16:
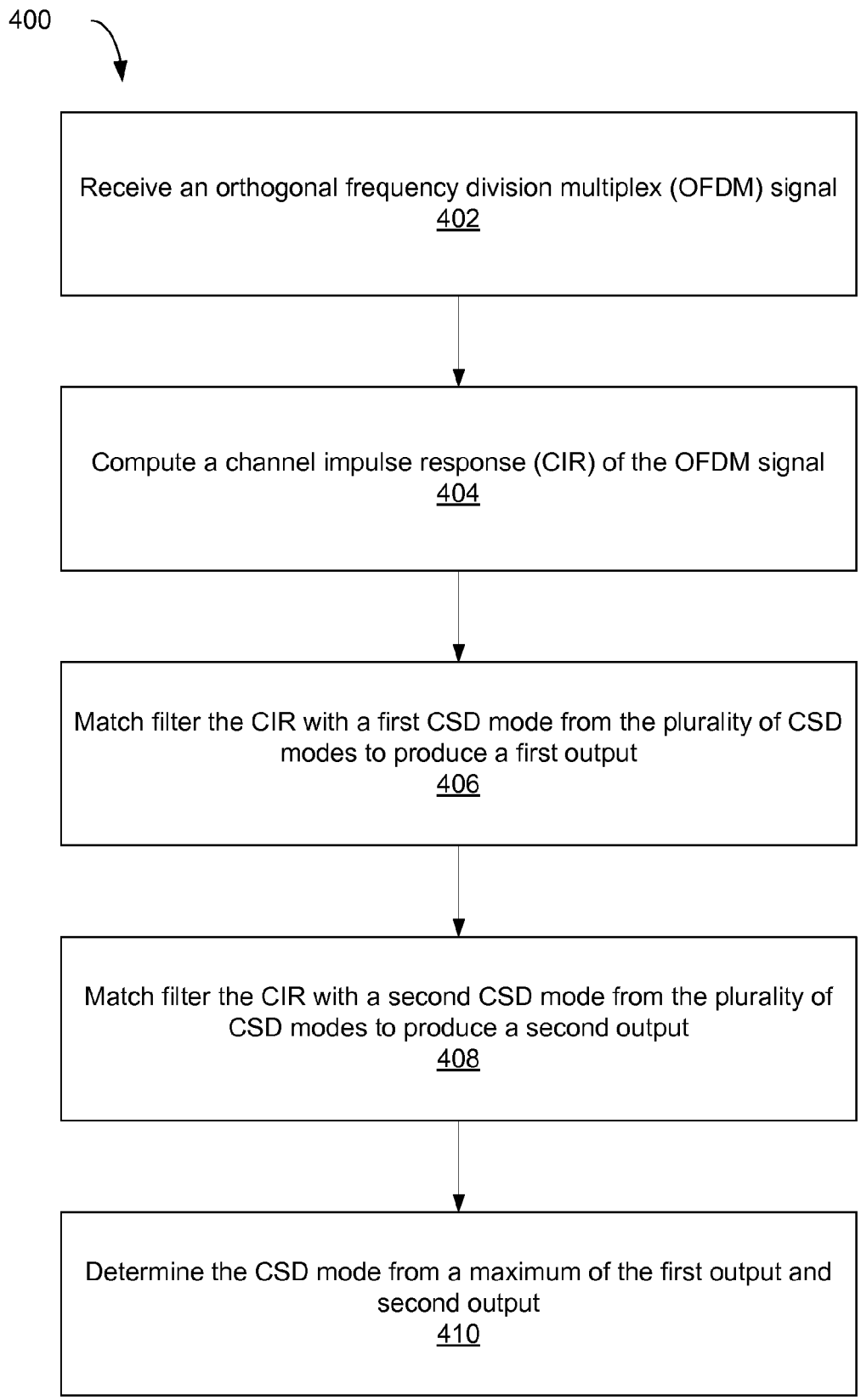
FIGS. 16 and 17 show methods in a mobile device for determining a cyclic shift delay (CSD) mode from a plurality of CSD modes, in accordance with some embodiments of the present invention.
Figure 17:
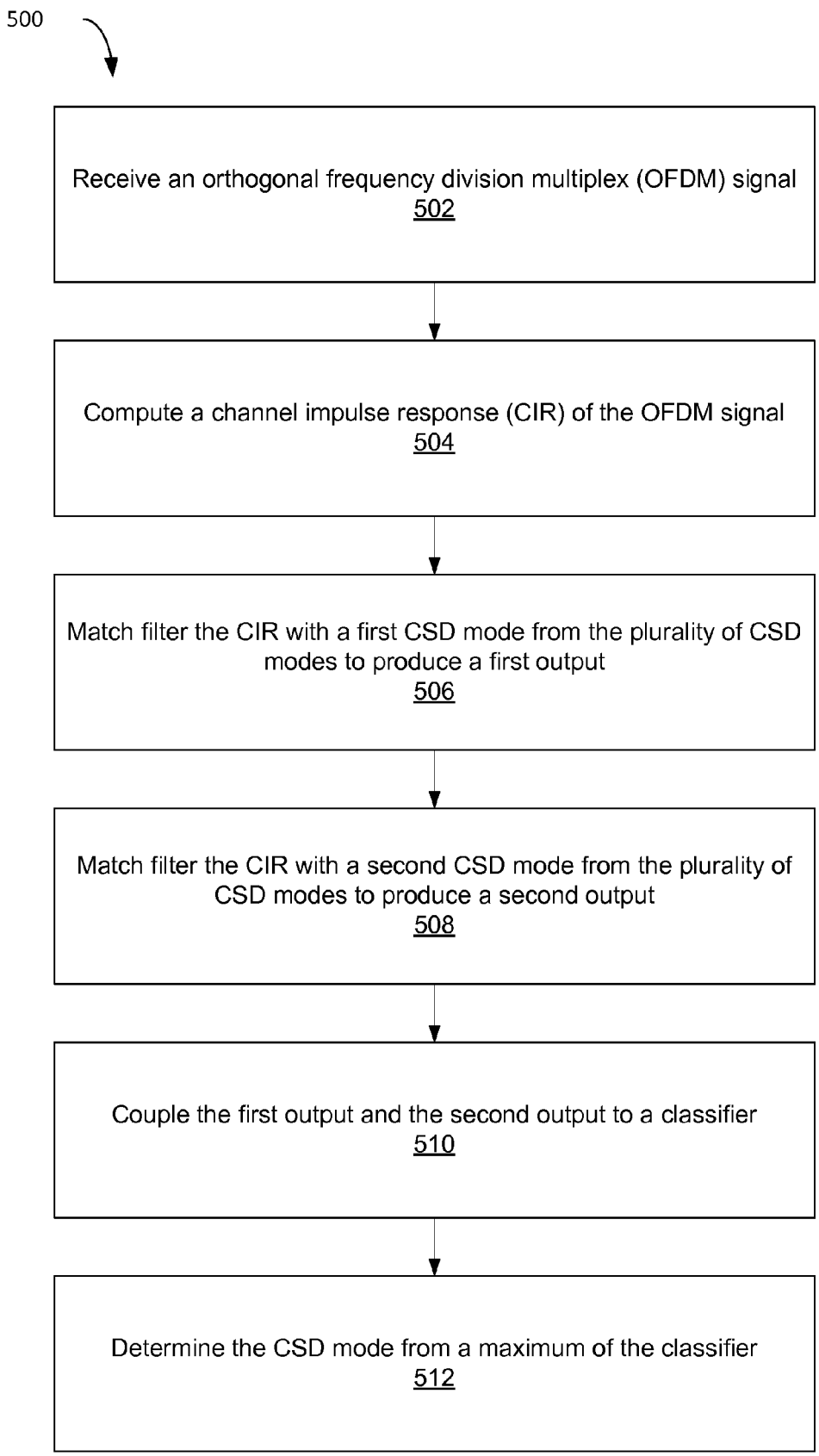

FIGS. 16 and 17 show methods in a mobile device for determining a cyclic shift delay (CSD) mode from a plurality of CSD modes, in accordance with some embodiments of the present invention. In FIG. 16, a method 400 in a mobile device shows how use a comparator to determine a cyclic shift delay (CSD) mode from a plurality of CSD modes. At step 402, a processor receives an orthogonal frequency division multiplex (OFDM) signal. At step 404, the processor computes a channel impulse response (CIR) of the OFDM signal. At step 406, the processor match filters the CIR with a first CSD mode from the plurality of CSD modes to produce a first output. At step 408, the processor match filters the CIR with a second CSD mode from the plurality of CSD modes to produce a second output. At step 410, the processor determines the CSD mode from a maximum of the first output and second output.

In FIG. 17, a method 500 in a mobile device shows how to use a classifier for determining a cyclic shift delay (CSD) mode from a plurality of CSD modes. At step 502, a processor receives an orthogonal frequency division multiplex (OFDM) signal. At step 504, the processor computes a channel impulse response (CIR) of the OFDM signal. At step 506, the processor match filters the CIR with a first CSD mode from the plurality of CSD modes to produce a first output. At step 508, the processor match filters the CIR with a second CSD mode from the plurality of CSD modes to produce a second output. At step 510, the processor couples the first output and the second output to a classifier. At step 512, the processor determines the CSD mode from a maximum of the classifier.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for determining a cyclic shift delay (CSD) mode from a plurality of CSD modes, the method comprising:
   receiving an orthogonal frequency division multiplex (OFDM) signal;
   computing a channel impulse response (CIR) of the OFDM signal;
   correlating the CIR with a first match filter corresponding to a first CSD mode from the plurality of CSD modes to produce a first output;
   correlating the CIR with a second match filter corresponding to a second CSD mode from the plurality of CSD modes to produce a second output; and
   determining the CSD mode based on a maximum of the first output and the second output.

2. The method of claim 1, further comprising normalizing the second output.

3. The method of claim 1, further comprising:
   correlating the CIR with a third match filter corresponding to a third CSD mode from the plurality of CSD modes to produce a third output;
   wherein determining the CSD mode is based on selecting a maximum of the first output, the second output and the third output.

4. The method of claim 3, further comprising normalizing the second output and the third output.

5. The method of claim 3, further comprising:
   correlating the CIR with a fourth match filter corresponding to a fourth CSD mode from the plurality of CSD modes to produce a fourth output;
   wherein determining the CSD mode is based on selecting a maximum of the first output, the second output, the third output and the fourth output.

6. The method of claim 5, further comprising normalizing the second output, the third output and the fourth output.

7. A method in a mobile device for determining a cyclic shift delay (CSD) mode from a plurality of CSD modes, the method comprising:
   receiving an orthogonal frequency division multiplex (OFDM) signal;
   computing a channel impulse response (CIR) of the OFDM signal;
   correlating the CIR with a first match filter corresponding to a first CSD mode from the plurality of CSD modes to produce a first output;
   correlating the CIR with a second match filter corresponding to a second CSD mode from the plurality of CSD modes to produce a second output;
   coupling the first output and the second output to a classifier; and
   determining the CSD mode based on a maximum of the classifier.

8. The method of claim 7, further comprising normalizing at least the first output and the second output.

9. The method of claim 7, further comprising:
   extracting a first feature in a time-domain of the CIR to produce a first extracted time-domain feature; and
   providing the first extracted time-domain feature to the classifier.

10. The method of claim 9, wherein the first extracted time-domain feature comprises a function of two maximum peaks.

11. The method of claim 10 wherein the function of two maximum peaks comprises a relative amplitude of two maximum peaks.

12. The method of claim 9, wherein the first extracted time-domain feature comprises a maximum time offset from the CSD mode.

13. The method of claim 9, wherein the first extracted time-domain feature comprises a function of peak energy and average energy.

14. The method of claim 13, wherein the function of the peak energy and the average energy comprises a ratio between the peak energy and the average energy.

15. The method of claim 9, further comprising:
   extracting a second time-domain feature of the CIR to produce a second extracted time-domain feature; and
   providing the second extracted time-domain feature to the classifier.

16. The method of claim 15, further comprising:
   extracting a third time-domain feature of the CIR to produce a third extracted time-domain feature; and
   providing the third extracted time-domain feature to the classifier.

17. The method of claim 16, wherein the second extracted time-domain feature comprises a maximum time offset from the CSD mode, and the third extracted time-domain feature comprises a function of peak energy and average energy.

18. The method of claim 16, further comprising:
   correlating the CIR with a third match filter corresponding to a third CSD mode from the plurality of CSD modes to produce a third output;
   correlating the CIR with a fourth match filter corresponding to a fourth CSD mode from the plurality of CSD modes to produce a fourth output; and
   normalizing at least three of the first output, the second output, the third output and the fourth output;
   wherein determining the CSD mode is based on selecting a maximum of the first output, the second output, the third output and the fourth output.

19. The method of claim 7, further comprising training the classifier during a training period using a first CIR and an identification of the first CSD mode known to be associated with the first CIR and using a second CIR and an identification of the second CSD mode known to be associated with the second CIR.

20. The method of claim 19, further comprising operating the classifier after the training period and during an operational period wherein the CSD mode associated with the CIR is unknown.

21. The method of claim 7, further comprising:
   converting in-phase and quadrature (I/Q) samples to a channel frequency response (CFR);
   extracting a first feature in a frequency domain for a CSD mode 2 signal from the CFR to produce a first extracted frequency-domain feature; and providing the first extracted frequency-domain feature to the classifier.

22. The method of claim 21, further comprising:
extracting a second feature in the frequency domain for a CSD mode 3 signal from the CFR to produce a second extracted frequency-domain feature; and
providing the second extracted frequency-domain feature to the classifier.

23. The method of claim 22, further comprising:
extracting a third feature in the frequency domain for a CSD mode 4 signal from the CFR to produce a third extracted frequency-domain feature; and
providing the third extracted frequency-domain feature to the classifier.

24. A method in a mobile device for determining a cyclic shift delay (CSD) mode from a plurality of CSD modes, the method comprising:
receiving an orthogonal frequency division multiplex (OFDM) signal;
converting in-phase and quadrature (I/Q) samples to a channel frequency response (CFR);
extracting a first feature in a frequency domain for a CSD mode 2 signal from the CFR to produce a first extracted frequency-domain feature;
providing the first extracted frequency-domain feature to a classifier; and
determining the CSD mode based on a maximum of the classifier.

25. The method of claim 24, further comprising:
extracting a second feature in the frequency domain for a CSD mode 3 signal from the CFR to produce a second extracted frequency-domain feature; and
providing the second extracted frequency-domain feature to the classifier.

26. The method of claim 25, further comprising:
extracting a third feature in the frequency domain for a CSD mode 4 signal from the CFR to produce a third extracted frequency-domain feature; and
providing the third extracted frequency-domain feature to the classifier.

27. A mobile device for determining a cyclic shift delay (CSD) mode from a plurality of CSD modes, the mobile device comprising:
a transceiver configured to receive an orthogonal frequency division multiplex (OFDM) signal;
a processor and memory configured to a receive the OFDM signal and to compute a channel impulse response (CIR) based on the OFDM signal, correlate the CIR with a first match filter corresponding to a first CSD mode from the plurality of CSD modes to produce a first output, correlate the CIR with a second match filter corresponding to a second CSD mode from the plurality of CSD modes to produce a second output, and determine the CSD mode based on a maximum of the first output and the second output.

28. The mobile device of claim 27, wherein the processor and memory further normalizes the second output.

29. The mobile device of claim 27, wherein the processor and memory are further configured to correlate the CIR a third match filter corresponding to with a third CSD mode from the plurality of CSD modes to produce a third output, wherein the processor and memory are further configured to determine the CSD mode based on a maximum of the first output, the second output, and the third output.

30. The mobile device of claim 29, wherein the processor and memory are further configured to correlate the CIR with a fourth match filter corresponding to a fourth CSD mode from the plurality of CSD modes to produce a fourth output, wherein the processor and memory are further configured to determine the CSD mode based on a maximum of the first output, the second output, the third output, and the fourth output.

31. A mobile device for determining a cyclic shift delay (CSD) mode from a plurality of CSD modes, the mobile device comprising:
a channel impulse response (CIR) unit;
a first matched filter coupled to the CIR unit;
a second matched filter coupled to the CIR unit; and
one of a comparator or a classifier coupled to the first matched filter and the second matched filter, wherein
the CIR unit is configured to receive an orthogonal frequency division multiplex (OFDM) signal and to generate a CIR signal based on the OFDM signal;
the first matched filter is configured to receive the CIR signal and to produce a first output by correlating the CIR signal based on a first CSD mode from the plurality of CSD modes;
the second matched filter is configured to receive the CIR signal and to produce a second output by correlating the CIR signal based on a second CSD mode from the plurality of CSD modes; and
the one of a comparator or the classifier is configured to determine the CSD mode based on a maximum of the first output and the second output.

32. The mobile device of claim 31, further comprising a normalizer coupled to the second matched filter.

33. The mobile device of claim 31, wherein the one of the comparator or the classifier comprises is the classifier.

34. The mobile device of claim 33, further comprising a first time-domain feature extractor coupled to the CIR unit and configured to receive the CIR signal and to produce a first time-domain extracted feature, wherein the classifier is further coupled to the first time-domain feature extractor and is further configured to determine the CSD mode based on the maximum of the first output, the second output and the first time-domain extracted feature.

35. The mobile device of claim 34, wherein the first time-domain feature extractor comprises a first time-domain extracted feature comprising a function of two maximum peaks.

36. The mobile device of claim 35, wherein the function of two maximum peaks comprises a relative amplitude of two maximum peaks.

37. The mobile device of claim 34, wherein the first feature extractor comprises a first extracted feature comprising a maximum time offset from the CSD mode.

38. The mobile device of claim 34, wherein the first time-domain feature extractor comprises a first time-domain extracted feature comprising a function of peak energy and average energy.

39. The mobile device of claim 38, wherein the function of the peak energy and the average energy comprises a ratio between the peak energy and the average energy.

40. The mobile device of claim 34, further comprising a second time-domain feature extractor coupled to the CIR unit and configured to receive the CIR signal and to produce a second time-domain extracted feature, wherein the classifier is further coupled to the second time-domain feature extractor and is further configured to determine the CSD mode based on the maximum of the first output, the second output and the first time-domain extracted feature and the second time-domain extracted feature.

41. The mobile device of claim 40, further comprising a third time-domain feature extractor coupled to the CIR unit and configured to receive the CIR signal and to produce a third time-domain extracted feature, wherein the classifier is further coupled to the third time-domain feature extractor and is further configured to determine the CSD mode based on the maximum of the first output, the second output and the first time-domain extracted feature, the second time-domain extracted feature, and the third time-domain extracted feature.

42. The mobile device of claim 33, further comprising:
a fast Fourier transform (FFT) unit, the FFT unit is configured to receive in-phase and quadrature (I/Q) samples from the OFDM signal and to generate a channel frequency response (CFR) signal based on the I/Q samples; and
a first frequency-domain feature extractor coupled to the FFT unit and configured to produce a first frequency-domain extracted feature based on the CFR signal, wherein the classifier is further coupled to the first frequency-domain feature extractor and is further configured to determine the CSD mode based on the maximum of the first output, the second output and the first frequency-domain extracted feature.

43. The mobile device of claim 42, wherein the first frequency-domain feature extractor comprises ratio between a null for a CSD mode 2 signal and a neighboring sub-channel of the null for the CSD mode 2 signal.

44. The mobile device of claim 42, further comprising a second frequency-domain feature extractor coupled to the FFT unit and configured to produce a second frequency-domain extracted feature based on the CFR signal, wherein the classifier is further coupled to the second frequency-domain feature extractor and is further configured to determine the CSD mode based on the maximum of the first output, the second output, the first frequency-domain extracted feature, and the second frequency-domain extracted feature.

45. The mobile device of claim 44, wherein the second frequency-domain feature extractor comprises ratio between a null for a CSD mode 3 signal and a neighboring sub-channel of the null for the CSD mode 3 signal.

46. The mobile device of claim 44, further comprising a third frequency-domain feature extractor coupled to the FFT unit and configured to produce a third frequency-domain extracted feature based on the CFR signal, wherein the classifier is further coupled to the third frequency-domain feature extractor and is further configured to determine the CSD mode based on the maximum of the first output, the second output, the first frequency-domain extracted feature, the second frequency-domain extracted feature, and the third frequency-domain extracted feature.

47. The mobile device of claim 46, wherein the third frequency-domain feature extractor comprises ratio between a null for a CSD mode 4 signal and a neighboring sub-channel of the null for the CSD mode 4 signal.

48. A mobile device for determining a cyclic shift delay (CSD) mode from a plurality of CSD modes, the mobile device comprising:
a fast Fourier transform (FFT) unit;
a first frequency-domain feature extractor coupled to the FFT unit;
a classifier coupled to the first frequency-domain feature extractor, wherein
the FFT unit is configured to receive in-phase and quadrature (I/Q) samples from an orthogonal frequency division multiplex (OFDM) signal and to generate a channel frequency response (CFR) signal based on the I/Q samples;
the first frequency-domain feature extractor is configured to receive the CFR signal and to produce a first frequency-domain extracted feature based on the CFR signal; and
the classifier is configured to receive the first frequency-domain extracted feature and to determine the CSD mode based on a maximum.

49. The mobile device of claim 48, wherein the first frequency-domain feature extractor comprises ratio between a null for a CSD mode 2 signal and a neighboring sub-channel of the null for the CSD mode 2 signal.

50. The mobile device of claim 48, further comprising a second frequency-domain feature extractor coupled to the FFT unit and configured to produce a second frequency-domain extracted feature based on the CFR signal, wherein the classifier is further coupled to the second frequency-domain feature extractor and is further configured to determine the CSD mode based on the maximum of the first frequency-domain extracted feature and the second frequency-domain extracted feature.

51. The mobile device of claim 50, wherein the second frequency-domain feature extractor comprises ratio between a null for a CSD mode 3 signal and a neighboring sub-channel of the null for the CSD mode 3 signal.

52. The mobile device of claim 50, further comprising a third frequency-domain feature extractor coupled to the FFT unit and configured to produce a third frequency-domain extracted feature based on the CFR signal, wherein the classifier is further coupled to the third frequency-domain feature extractor and is further configured to determine the CSD mode based on the maximum of the first frequency-domain extracted feature, the second frequency-domain extracted feature, and the third frequency-domain extracted feature.

53. The mobile device of claim 52, wherein the third frequency-domain feature extractor comprises ratio between a null for a CSD mode 4 signal and a neighboring sub-channel of the null for the CSD mode 4 signal.

54. A mobile device for determining a cyclic shift delay (CSD) mode from a plurality of CSD modes, the mobile device comprising:
means for receiving an orthogonal frequency division multiplex (OFDM) signal;
means for computing a channel impulse response (CIR) of the OFDM signal;
means for correlating the CIR with a first match filter corresponding to a first CSD mode from the plurality of CSD modes to produce a first output;
means for correlating the CIR with a second match filter corresponding to a second CSD mode from the plurality of CSD modes to produce a second output; and
means for determining the CSD mode based on a maximum of the first output and the second output.

55. The mobile device of claim 54, further comprising:
means for correlating the CIR with a third match filter corresponding to a third CSD mode from the plurality of CSD modes to produce a third output;
wherein the means for determining the CSD mode is based on means for selecting a maximum of the first output, the second output and the third output.

56. A mobile device for determining a cyclic shift delay (CSD) mode from a plurality of CSD modes, the mobile device comprising:
means for receiving an orthogonal frequency division multiplex (OFDM) signal;
means for computing a channel impulse response (CIR) of the OFDM signal;

means for correlating the CIR with a first match filter corresponding to a first CSD mode from the plurality of CSD modes to produce a first output;
means for correlating the CIR with a second match filter corresponding to a second CSD mode from the plurality of CSD modes to produce a second output;
means for coupling the first output and the second output to a classifier; and
means for determining the CSD mode based on a maximum of the classifier.

57. The mobile device of claim 56, further comprising:
means for extracting a first feature in a time-domain of the CIR to produce a first extracted time-domain feature; and
means for providing the first extracted time-domain feature to the classifier.

58. The mobile device of claim 56, further comprising:
means for converting in-phase and quadrature (I/Q) samples to a channel frequency response (CFR);
means for extracting a first feature in a frequency domain for a CSD mode 2 signal from the CFR to produce a first extracted frequency-domain feature; and
means for providing the first extracted frequency-domain feature to the classifier.

59. A mobile device for determining a cyclic shift delay (CSD) mode from a plurality of CSD modes, the mobile device comprising:
means for receiving an orthogonal frequency division multiplex (OFDM) signal;
means for converting in-phase and quadrature (I/Q) samples to a channel frequency response (CFR);
means for extracting a first feature in a frequency domain for a CSD mode 2 signal from the CFR to produce a first extracted frequency-domain feature;
means for providing the first extracted frequency-domain feature to a classifier; and
means for determining the CSD mode based on a maximum of the classifier.

60. The mobile device of claim 59, further comprising:
means for extracting a second feature in the frequency domain for a CSD mode 3 signal from the CFR to produce a second extracted frequency-domain feature; and
means for providing the second extracted frequency-domain feature to the classifier.

61. The mobile device of claim 60, further comprising:
means for extracting a third feature in the frequency domain for a CSD mode 4 signal from the CFR to produce a third extracted frequency-domain feature; and
means for providing the third extracted frequency-domain feature to the classifier.

62. A non-transitory computer-readable storage medium for determining a cyclic shift delay (CSD) mode from a plurality of CSD modes, the non-transitory computer-readable storage medium including program code stored thereon, the program code, when executed by a processor, comprising code for:
receiving an orthogonal frequency division multiplex (OFDM) signal;
computing a channel impulse response (CIR) of the OFDM signal;
correlating the CIR with a first match filter corresponding to a first CSD mode from the plurality of CSD modes to produce a first output;
correlating the CIR with a second match filter corresponding to a second CSD mode from the plurality of CSD modes to produce a second output; and
determining the CSD mode based on a maximum of the first output and the second output.

63. The non-transitory computer-readable storage medium of claim 62, further comprising code for:
correlating the CIR with a third match filter corresponding to a third CSD mode from the plurality of CSD modes to produce a third output;
wherein determining the CSD mode is based on selecting a maximum of the first output, the second output and the third output.

64. A non-transitory computer-readable storage medium for determining a cyclic shift delay (CSD) mode from a plurality of CSD modes, the non-transitory computer-readable storage medium including program code stored thereon, the program code, when executed by a processor, comprising code for:
receiving an orthogonal frequency division multiplex (OFDM) signal;
computing a channel impulse response (CIR) of the OFDM signal;
correlating the CIR with a first match filter corresponding to a first CSD mode from the plurality of CSD modes to produce a first output;
correlating the CIR with a second match filter corresponding to a second CSD mode from the plurality of CSD modes to produce a second output;
coupling the first output and the second output to a classifier; and
determining the CSD mode based on a maximum of the classifier.

65. The non-transitory computer-readable storage medium of claim 64, further comprising code for:
extracting a first feature in a time-domain of the CIR to produce a first extracted time-domain feature; and
providing the first extracted time-domain feature to the classifier.

66. A non-transitory computer-readable storage medium for determining a cyclic shift delay (CSD) mode from a plurality of CSD modes, the non-transitory computer-readable storage medium including program code stored thereon, the program code, when executed by a processor, comprising code for:
receiving an orthogonal frequency division multiplex (OFDM) signal;
converting in-phase and quadrature (I/Q) samples to a channel frequency response (CFR);
extracting a first feature in a frequency domain for a CSD mode 2 signal from the CFR to produce a first extracted frequency-domain feature;
providing the first extracted frequency-domain feature to a classifier; and
determining the CSD mode based on a maximum of the classifier.

67. The non-transitory computer-readable storage medium of claim 66, further comprising code for:
extracting a second feature in the frequency domain for a CSD mode 3 signal from the CFR to produce a second extracted frequency-domain feature; and
providing the second extracted frequency-domain feature to the classifier.

* * * * *

UNITED STATES PATENT AND TRADEMARK OFFICE
CERTIFICATE OF CORRECTION

PATENT NO.         : 9,497,641 B2
APPLICATION NO.    : 13/759844
DATED              : November 15, 2016
INVENTOR(S)        : Lionel Jacques Garin et al.

It is certified that error appears in the above-identified patent and that said Letters Patent is hereby corrected as shown below:

In the Claims

In Column 15, Line 31, in Claim 1, that portion of that claim reading "the CSD mode based on a maximum" should read -- a CSD mode based on a maximum --.

In Column 16, Line 1, in Claim 7, that portion of that claim reading "the CSD mode based on a maximum" should read -- a CSD mode based on a maximum --.

In Column 16, Line 13, in Claim 11, that portion of the claim reading "The method of claim 10" should read -- The method of claim 10, --.

In Column 17, Line 27, in Claim 24, that portion of that claim reading "the CSD mode based on a maximum" should read -- a CSD mode based on a maximum --.

In Column 17, Line 45, in Claim 27, that portion of the claim reading "division multiplex (OFDM) signal;" should read -- division multiplex (OFDM) signal; and --.

In Column 17, Line 54, in Claim 27, that portion of that claim reading "the CSD mode based on a maximum" should read -- a CSD mode based on a maximum --.

In Column 18, Line 13, in Claim 31, that portion of the claim reading "second matched filter, wherein" should read -- second matched filter, wherein: --.

In Column 18, Line 26, in Claim 31, that portion of that claim reading "the CSD mode based on a maximum" should read -- a CSD mode based on a maximum --.

In Column 18, Line 31, in Claim 33, that portion of the claim reading "classifier comprises is the classifier" should read -- classifier is the classifier --.

Signed and Sealed this
Fourteenth Day of February, 2017

Michelle K. Lee
*Director of the United States Patent and Trademark Office*

CERTIFICATE OF CORRECTION (continued)
U.S. Pat. No. 9,497,641 B2

In Column 19, Line 60, in Claim 48, that portion of the claim reading "FFT unit;" should read -- FFT unit; and --.

In Column 19, Line 62, in Claim 48, that portion of the claim reading "extractor, wherein" should read -- extractor, wherein: --.

In Column 20, Line 7, in Claim 48, that portion of that claim reading "the CSD mode based on a maximum" should read -- a CSD mode based on a maximum --.

In Column 20, Line 52, in Claim 54, that portion of that claim reading "the CSD mode based on a maximum" should read -- a CSD mode based on a maximum --.

In Column 21, Line 37, in Claim 59, that portion of that claim reading "the CSD mode based on a maximum" should read -- a CSD mode based on a maximum --.

In Column 22, Line 4, in Claim 62, that portion of that claim reading "the CSD mode based on a maximum" should read -- a CSD mode based on a maximum --.

In Column 22, Line 33, in Claim 64, that portion of that claim reading "the CSD mode based on a maximum" should read -- a CSD mode based on a maximum --.

In Column 22, Line 56, in Claim 66, that portion of that claim reading "the CSD mode based on a maximum" should read -- a CSD mode based on a maximum --.